April 14, 1964  R. L. DEGA ETAL  3,128,880
SPRING DETECTION DEVICE
Filed April 4, 1961  3 Sheets-Sheet 3

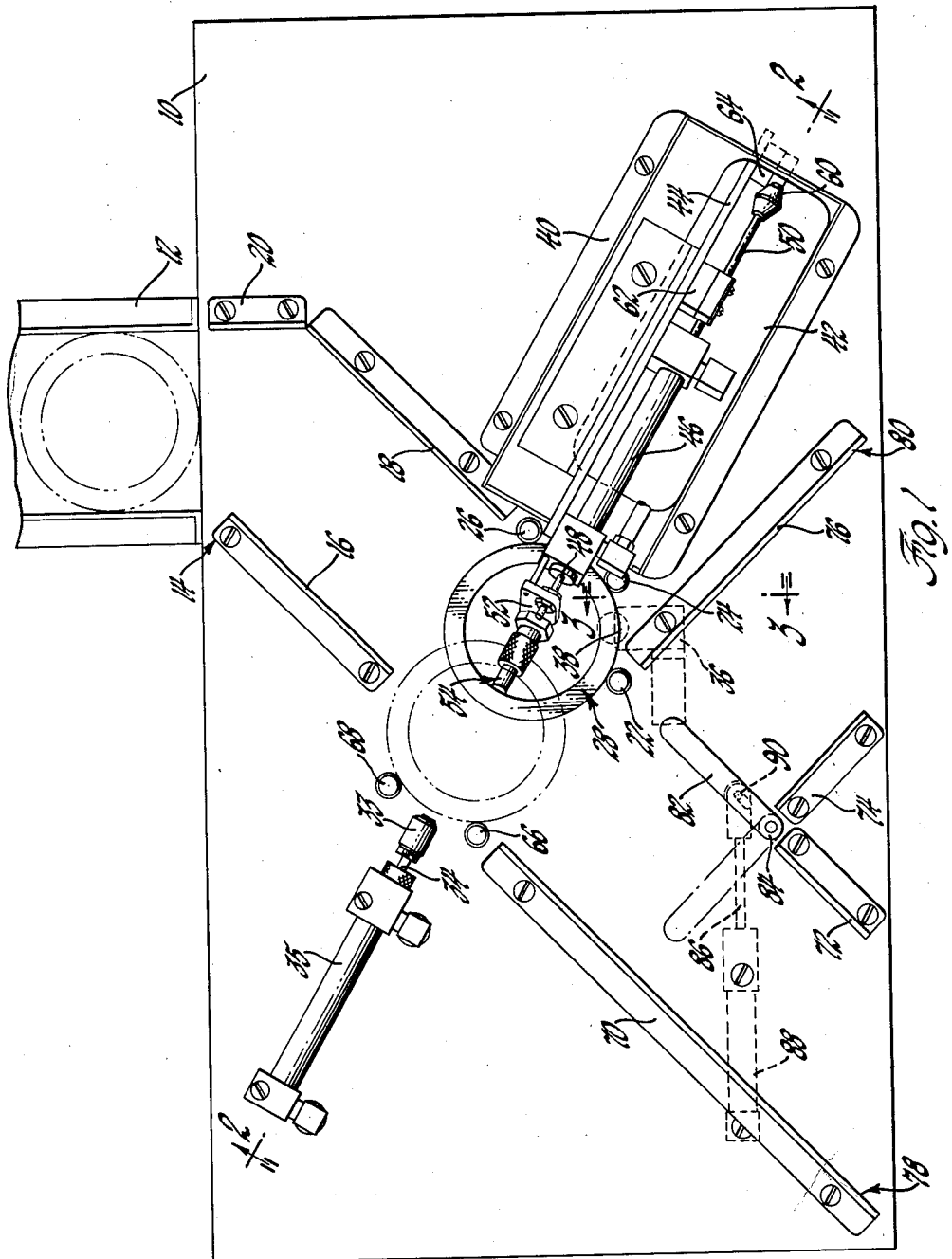

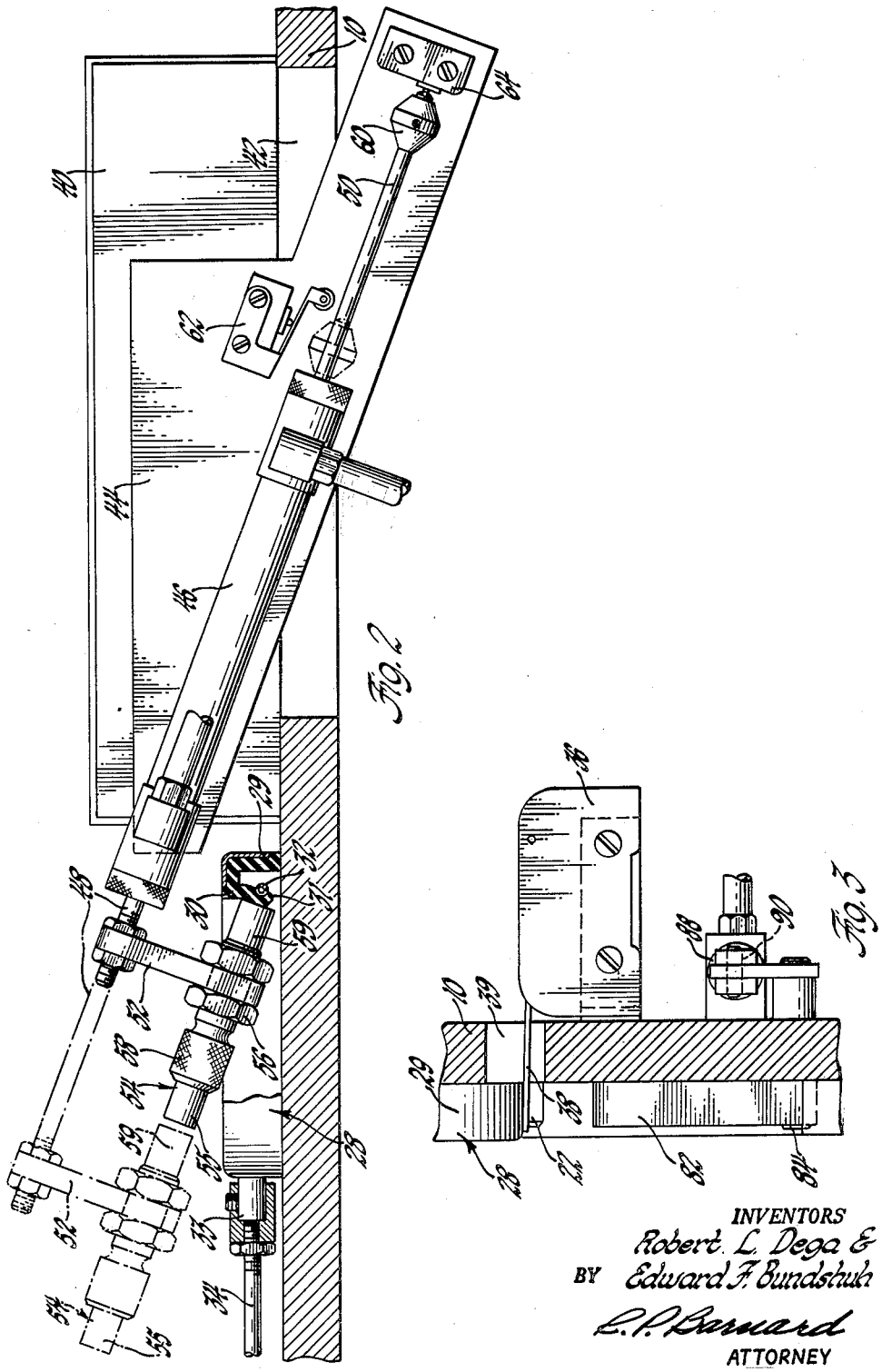

INVENTORS
Robert L. Dega &
BY Edward F. Bundshuh
R. P. Barnard
ATTORNEY

3,128,880
SPRING DETECTION DEVICE
Robert L. Dega, Utica, and Edward F. Bundshuh, Berkley, Mich., assignors to General Motors Corporation, Detroit, Mich., a corporation of Delaware
Filed Apr. 4, 1961, Ser. No. 100,698
3 Claims. (Cl. 209—111.5)

This invention relates to apparatus for detecting the presence or absence of a metallic element in a manufactured part, and more particularly, to detection apparatus for determining the presence or absence of a spring element in a seal unit.

This invention is particularly adapted and designed for use with a lip-type seal, although other applications may be possible. In general, lip-type seals comprise annular sealing units which are adapted to be sealingly positioned between a shaft and a concentric housing. Lip-type seals commonly comprise a metallic outer casing within which an elastomer member is secured. A radially inwardly extending lip portion is provided on the elastomer member for wiping engagement with a shaft. A mechanical springing device, such as a garter spring element, is commonly associated with the lip portion to exert a predetermined radially inwardly directed force about the periphery of the lip portion during engagement with a shaft. If a lip-type seal is not properly equipped with a mechanical springing device to hold the lip portion against the shaft, the seal will not function properly. In the mass production of seal units, it is not uncommon for the seal spring element to be inadvertently omitted. In addition, the seal springs often are dislodged during shipping, handling and storing between the factory and the ultimate user. Accordingly, it has been common practice to provide complete visual inspection of such seals before they are finally assembled on a shaft in use. Visual inspection is costly and not entirely accurate.

The objects of this invention are, therefore, to provide apparatus for detecting the presence or absence of spring elements in seal units in an automatic and economical manner; to provide new and improved metallic element detecting apparatus; to provide new and improved apparatus for directing a unit to be tested to and from a test position; and to provide new and improved control apparatus for actuating metallic detecting mechanism and for separating satisfactory units from unsatisfactory units as determined by the detecting apparatus.

Other objects and advantages of the present invention are disclosed in the following detailed description, in which reference is made to the accompanying drawings wherein:

FIGURE 1 is a side elevational view of the preferred embodiment of the invention;

FIGURE 2 is a partial sectional view taken along the line 2—2 in FIGURE 1;

FIGURE 3 is a partial sectional view taken along the line 3—3 in FIGURE 1; and

Figure 4:
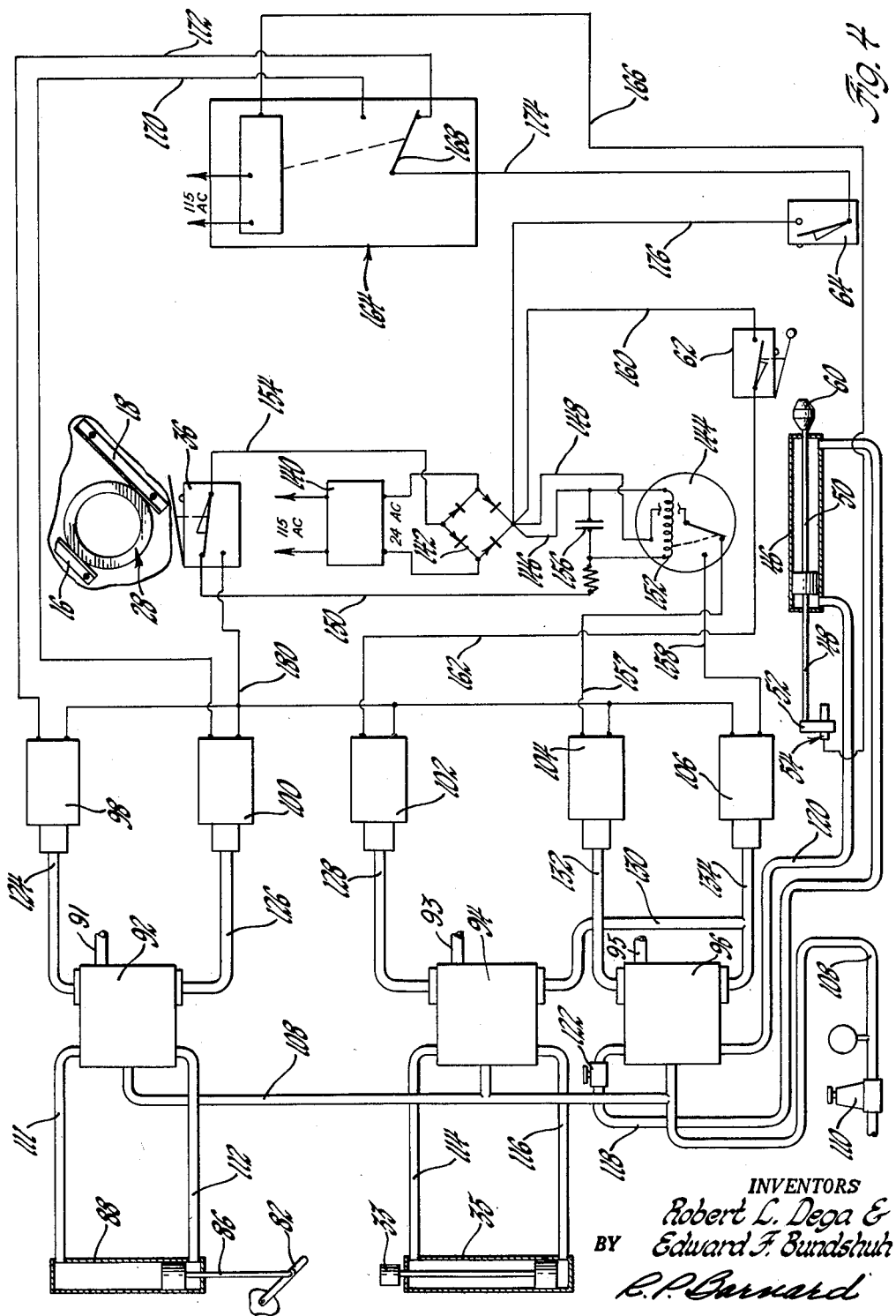
FIGURE 4 is a schematic and diagrammatic view of an electropneumatic control circuit for the apparatus shown in FIGURE 1.

Referring now to FIGURE 1, the detecting apparatus may be conveniently mounted on a support plate 10 or the like. The illustrative arrangement is particularly well adapted for use with an automatic seal checking machine, such as described in my co-pending application, Serial No. 25,963, Fluid Seal Testing Machine, filed May 2, 1960. However, the present apparatus can be used with other types of equipment in a similar manner. The support plate 10 is vertically inclined so that seal units delivered from a downwardly inclined exit chute 12 of the aforementioned seal testing machine will roll or slide into a chute 14 provided on the plate 10 by parallel spaced L-shaped guide rails 16, 18 and L-shaped guide rail 20 aligned with the exit chute 12. Support means for receiving and retaining a seal unit are provided at the lower end of the chute 14 and comprise a plurality of accurately spaced pin or rod members 22, 24, 26 which are adapted to engage the periphery of a lip-type seal unit 28 as it is delivered from the chute 14. As shown in FIGURE 2, the lip-type seal unit 28 is conventional and comprises a metallic outer casing 29 within which an elastomer member 30 is secured. A flexible lip portion 31 of the elastomer member extends radially inwardly for wiping engagement with a shaft in use. A spring element 32 is mounted about the periphery of the lip portion 31.

A movable clamping means is provided to secure the seal unit 28 on the pins 22, 24, 26 and comprises a permanent magnet 33 mounted on the end of a piston rod 34 of motor means, such as a power cylinder 35, which is secured to the support plate 10. The cylinder 35 is mounted so that the piston rod 34 moves in a path transverse to the chute 14 and so that the end of the magnet 33 will engage the casing of a seal 28 supported on the pins 22, 24, 26 at substantially right angles as shown in FIGURE 2. A switch means 36 is mounted on the opposite side of support plate 10 to actuate the cylinder 35 when a seal unit 28 is in place on the pins 22, 24, 26. An actuating finger or arm 38 of the switch means 36 extends upwardly through an opening 39 in the support plate and between the pin members 22, 24 for actuating engagement with the seal unit 28 when the seal unit is located on the pin members as shown in FIGURE 3.

A movable probe means unit is mounted on the support plate 10 adjacent the pin members 22, 24, 26 and comprises a support bracket 40 secured to the support plate by any suitable means. An elongated slot 42 is provided in the support plate adjacent the pin members and the bracket 40 is mounted thereabout. A portion 44 of the bracket extends through the slot 42 and a power cylinder 46 is secured thereto in any suitable manner. The power cylinder 46 is inclined relative to the support plate 10 and is provided with a double-ended piston rod having end portions 48, 50. A probe support arm 52 is secured to the end 48 of the cylinder 46 and supports a spring detecting means unit 54 on the end thereof. The spring detecting unit 54 comprises an elongated shaft 55 which is adjustably rotatably supported within a nut unit 56 secured to the arm 52 and includes a knurled portion 58 to provide handle means to rotate the shaft within the nut unit. A conventional electromagnetic or inductive sensing unit 59 is mounted on the other end of the shaft 55 and may be axially displaced by rotation of the shaft in the nut unit. The shaft is supported substantially parallel to the double-ended piston rod of the cylinder 46. The angle of inclination of the piston rod and of the support rod are sufficient to permit the sensing unit 59 of the support rod to be moved into engagement with the inner periphery of the flexible lip 30 immediately adjacent the location of the spring element 31 as shown in FIGURE 2. A sensing unit is mounted in the end 58 of the rod 55 and electrically connected to a magnetic pickup assembly as hereinafter described with reference to FIGURE 4. A switch actuating cam element 60 is mounted on the other end 50 of the double-ended piston rod and is adapted to travel in a path to actuate switch members 62, 64 for a purpose to be hereinafter described.

A release means is provided to remove the seal unit 28 from engagement with the pins 22, 24, 26 after the unit has been checked and comprises spaced pin members 66, 68 between which the piston rod 34 of the cylinder 35 is extended. The pin members 66, 68 are located relative to the retracted position of the piston rod 34 and the magnet 33 so that a seal unit 28 will be removed from the pins 22, 24, 26 by the magnet and carried thereby until the seal unit engages the pins 66, 68 to disengage the magnet 33 from the metallic casing 29 of the seal unit.

Exit chute means comprising L-shaped guide elements 70, 72, 74 and 76 are secured to the support plate 10 below the stripper pins 66, 68 to form a chute 78 for acceptable seals having spring elements and a chute 80 for unacceptable seals which have no spring elements. Seal selection means are provided to guide the seal units into the appropriate chutes and include a pivotally mounted deflecting arm 82 which is pivoted at the intersection 84 of the guide elements 72, 74 and is controllably linked to a piston rod 86 of an actuating power cylinder 88 through a pin and slot connection 90.

Referring now to FIGURE 4, control means for controlling inspection of the seal units 28 is illustrated and comprises an electrical portion and a hydraulic or pneumatic portion. The hydraulic or pneumatic portion includes suitable valve means to control actuation of the power cylinders 35, 46, 88 and includes conventional four-way valves 92, 94, 96 for each of the cylinders. In addition, two-way solenoid-operated control valves 98, 100, 102, 104 and 106 are provided to control the valving operation of the four-way valves. The illustrated system is pneumatic and is connected to a high pressure source (not shown) by an inlet conduit 108 through a pressure regulator 110. The inlet line 108 connects to each of the four-way valves 92, 94, 96 having exhaust ports 91, 93, and 95 provided for exhausting to atmosphere the cylinders 35, 46, and 88. The four-way valve 92 is connected by conduits 111 and 112 to the cylinder 88; the four-way valve 94 is connected by conduit 114, 116 to the cylinder 35 and the four-way valve 96 is connected by conduits 118, 120 to the power cylinder 46. These conduits alternately pressurize and exhaust the cylinders when communicating through the four-way valves with the line 108 and the exhaust ports respectively. A one-way throttling or speed control valve 122 is connected in the conduit 118 for a purpose to be hereinafter described. The solenoid control valves 98, 100 are connected to the four-way valve 92 by air release conduits 124, 126; the solenoid control valves 102, 106 are connected to the four-way valve 94 by air release conduits 128, 130; and the solenoid control valves 104, 106 are connected to the four-way valve 96 by air release conduits 132, 134. These conduits alternately release air from the valves 92, 94, and 96 to control the valving of the pressure and exhaust lines leading to the cylinder.

The electrical portion of the control means comprises a transformer 140 and a rectifier 142 which are connected to a suitable power source. A relay 144 is connected to the rectifier 142 through lines 146, 148, 150. The coil 152 of the relay is connected through the lines 146, 150, the switch 36 and a line 154 to the rectifier 142. A condenser 156 is connected across the lines 146, 150 for a purpose to be hereinafter described. The relay 144 controls energization of solenoid valves 104, 106 through lines 157, 158. Energization of solenoid valve 102 is controlled by switch 62 in lines 160 and 162. A conventional magnetic pick-up assembly 164 is connected to the magnetic probe 54 on the piston rod 48 by a line 166 and includes a switch 168 which is actuated in response to signals generated by the sensing unit 54 between lines 170 and 172 which control energization of solenoid control valves 98, 100. The switch 168 is connected by lines 174 and 176 through the control switch 64 to the rectifier 142. Energization of the solenoid valves 98, 100, 102, 104 and 106 is additionally controlled by the switch 36 which connects the return line 180 to the rectifier 142 through the line 154.

*Operation*

Referring now to FIGURES 1 and 4, the power cylinders and the switches are normally in the positions indicated when a seal unit 28 rolls down the trackway provided by the guide elements 16, 18. In the normal position, the switch 36 completes a circuit between the lines 150, 154 to energize the coil 152 of the solenoid 144 which maintains the relay switch in the position indicated completing a circuit between the lines 148 and 157. The solenoid valve 104 is not actuated because the return line 180 is disconnected from the line 154. At this time, the condenser 156 is energized through the lines 146, 150 and a charge is accumulated thereby. When the seal unit 28 engages the pin members 22, 24, 26, the switch 36 is actuated to complete a circuit between the lines 154 and 180. Current is then supplied to the solenoid valves. The charge accumulated by the condenser is sufficient to keep the coil 152 of the relay 144 energized for a predetermined time thereafter to provide time delay means and the solenoid valve 104 is energized. Actuation of the solenoid valve 104 actuates the four-way valve 96 through the air release conduit 132 to permit high pressure air from the line 108 to flow to the cylinder 46 through the line 120. This initiates air cylinder 46. The piston in the cylinder 46 is delayed because of the provision of a one-way throttling valve 122 in the line 118 which control movements of the probe unit 54 into engagement with the inner periphery of the lip portion 31 of the seal. Line 118 is presently exhausting the cylinder at valve 96. At the proper moment the cam 60 engages microswitch 62 to connect lines 160, 162 to energize solenoid 102 thereby actuating the four-way valve 94 causing it to connect pressure line 108 with line 116 initiating cylinder 35. Exhaust from cylinder 35 escapes through passage 114 and valve 94. The piston in the cylinder 35 is immediately actuated to extend the magnetic head 33 into engagement with the metallic casing of the seal unit 28 and to clamp the seal unit in position on the pins 22, 24, and 26. When the sensing head 54 is in position, the cam 60 on the other end of the cylinder rod 50 engages the switch 64 to complete a circuit between the lines 176, 174. In this manner, the apparatus controlled by the sensing means through the lines 170, 172 is not energized until the probe means 54 is in its proper location relative to the lip portion 31 and spring element 32. In this manner, any effects on the sensing circuit by the metallic casing 29 of the seal unit or any other metallic objects will not affect the intended detection of the presence or absence of a spring element. The conventional sensing unit 58 has a certain predetermined frequency input which changes conductance characteristics when placed near a metallic object. Variations in conductance are utilized by magnetic pick-up assembly 164 to actuate a relay through the line 166 to move the switch 168 between the lines 170 and 172. When a spring element is present in a seal unit being tested, the switch 168 energizes the line 172 to actuate the solenoid valve 98. The solenoid valve 98 actuates the four-way valve 92 through the conduit 124 which communicates conduit 111 with pressure line 108 to maintain the piston in the cylinder 88 in the position shown and the deflecting arm 82 in a position parallel to the guide element 72 so that acceptable seal units which are removed from the clamping means roll down the chute 78. If a seal having no spring element is being tested, the variation in conductance causes actuation of the switch 168 to energize the line 170 and actuate the solenoid valve 100. The four-way valve 92 is actuated through the conduit 126 to permit high pressure air from the line 108 to actuate the piston of cylinder 88 through the conduit 112, the conduit 111 presently exhausting cylinder 88 at valve 92. The deflecting arm 82 is pivotally displaced by the piston rod 86 to a position parallel to the guide element 74 to direct the seal unit into the unacceptable chute 80. The probe unit 54 is retracted after the predetermined time delay determined by the time needed until the charge on the condenser 156 is no longer sufficient to energize the coil 152 and the switch of the relay 144 moves to connect the line 148 with the line 158. At this time, the solenoid valve 106 is energized and the four-way valves 96 and 94 are controllably actuated through the conduits 134 and 130 to cause high pressure air from the conduit 108 to pass through the conduits 118 and 114 and actuate the power cylinders 46 and 35 to retract the probe unit 54 and head 33 immediately. The one-way throttle valve 122 does not restrict the high pressure delivery through line 118, only the exhaust. During the withdrawal of the probe 54 and clamp head 33 the cylinders 35 and 46 are respectively exhausted through lines 116 and 120 at four-way valves 94 and 96. During retracting movement of the probe unit, the cam 60 strikes the switch 62 to connect the line 160 and the line 162 which would normally energize the solenoid valve 102. However, this cannot occur since the seal has previously been withdrawn by head 33 and switch 36 has returned to the position shown disconnecting all the solenoid valves on line 180 from line 154. Current is again supplied from line 154 to line 150 and solenoid 144 is energized moving the relay switch to its normal position as shown. As the magnetic clamp 33 is retracted, the metallic casing of the seal unit 28 is magnetically held thereagainst until the magnetic clamp passes between the stripper pins 66, 68. The seal unit 28 is disengaged from the magnetic clamp and rolls into the discharge chutes wherein it is directed into the acceptable chute 78 or the unacceptable chute 80 by the position of the deflection arm 82. As soon as the seal unit 28 being tested is released from the magnetic clamp 33, another seal unit can drop into position on the pins 22, 24, 26 and the testing cycle is repeated.

The details of construction of the foregoing apparatus are intended to be illustrative insofar as obvious modifications may be made without departing from the essence of this invention. Accordingly, it is not intended to limit this invention to the details of construction or the particular arrangement of the parts except insofar as limited by the prior art.

What we claim is:

1. Apparatus for testing lip-type seal units for the presence of metallic spring elements associated with the lip portion thereof comprising support means for receiving and retaining a lip-type seal unit, inductive sensing means including a movable sensing head adapted to produce a signal when in proximity to metallic objects, said sensing head being engagable with the lip portion of said seal unit when said seal unit is received and retained by said support means and circuit means electrically connected to said head and responsive to the signal produced therein to indicate the presence or absence of said spring, reject means controlled by said inductive sensing means to reject means controlled by said inductive sensing means to reject seal units where the absence of a spring is detected, and switch means responsive to the lip engaging position of the sensing head to prevent accidental control of the reject means by the inductive sensing means occasioned by spurious signals produced on movement of the sensing head near metallic objects other than said spring, said reject means being operative when the sensing head is disengaged from the lip to effect rejection of defective seal units.

2. Apparatus for testing lip-type seal units having metallic casings for the presence of metallic spring elements associated with the lip portion thereof comprising support means for receiving and retaining a lip-type seal unit, first switch means actuated by said seal unit when received and retained by said support means, inductive sensing means including a movable sensing head adapted to produce a signal when in proximity to metallic objects, said sensing head being engagable with the flexible lip portion of said seal unit when said seal unit is received and retained by said support means and circuit means electrically connected to said head and responsive to the signal produced therein to indicate the presence or absence of a spring, motor means provided to move said sensing head between a first position of disengagement and a second position of engagement with said seal unit, said first switch means being controllably connected to said motor means to effect movement of said sensing head into said second position when said seal unit is received and retained by said support means, time delay means initiated by said first switch means controllably connected to said motor means to effect movement of said sensing head to said first position after spring detection has occurred, reject means controlled by said inductive sensing means adapted to reject seal units where the absence of a spring is detected, and second switch means being activated by said motor means when the sensing head is in its second position to prevent accidental control of the reject means by the inductive sensing means occasioned by spurious signals produced on movement of the sensing head near metallic objects other than said spring, said reject means being operative when the sensing head is in said first position to effect rejection of defective seal units.

3. Apparatus for testing lip-type seal units having ferrometallic casings for the presence of a metallic spring element associated with the lip portion thereof comprising support means for receiving and retaining a lip-type seal unit, first switch means actuated by said seal unit when received and retained by said support means, inductive sensing means including a movable sensing head adapted to produce a signal when in the proximity of said spring, said sensing head being engagable with the flexible lip portion of said seal unit when said seal unit is received and retained by said support means and a circuit means electrically connected to said head and responsive to the signal produced therein to indicate the presence or absence of said spring, first motor means to move said sensing head between a first position of disengagement and a second position of engagement with said seal unit, and first switch means being controllably connected to said first motor means to effect movement of said head into said second position when said seal unit is received and retained by said support means, second switch means positioned in the path of movement of and adapted to be actuated by said first motor means, movable clamping means including a magnetic head adapted to engage the ferrometallic casing portion of said seal unit and magnetically hold said seal fixedly thereto, second motor means connected to said clamping means to effect movement of said clamping means between a clamped position when said seal is retained in said support means and a retracted position where said seal is withdrawn from said support means, said second switch means controllably connected to said second motor means to effect movement of said clamp into the clamped position, time delay means initiated by said first switch means controllably connected to said first and second motor means to effect movement of said sensing head to said first position and said clamp means to said retracted position respectively, and third switch means being activated by said first motor means when the sensing head is in said second position to prevent accidental control of the reject means by the inductive sensing means occasioned by spurious signals produced on movement of the sensing head near metallic objects other than said spring, said reject means being operative when the sensing head is in said first position to effect rejection of defective seal units.

References Cited in the file of this patent

UNITED STATES PATENTS

| | | |
|---|---|---|
| 1,795,287 | Bottome | Mar. 10, 1931 |
| 2,762,970 | Balduman | Sept. 11, 1956 |

UNITED STATES PATENT OFFICE
CERTIFICATE OF CORRECTION

Patent No. 3,128,880                                    April 14, 1964

Robert L. Dega et al.

It is hereby certified that error appears in the above numbered patent requiring correction and that the said Letters Patent should read as corrected below.

Column 5, line 52, strike out "to reject means controlled by said inductive sensing means"; column 6, line 38, for "and" read -- said --.

Signed and sealed this 20th day of October 1964.

(SEAL)
Attest:

ERNEST W. SWIDER
Attesting Officer

EDWARD J. BRENNER
Commissioner of Patents